Dec. 22, 1959 G. P. BENTLEY ET AL 2,918,542
HERMETICALLY SEALED ROTARY SWITCHES
Filed June 11, 1957 5 Sheets-Sheet 1

INVENTORS
GEORGE P. BENTLEY
GEORGE C. McNABB
EDWARD L. LEWIS
BY Thomas S. Ross
Joseph R. Spalla
ATTORNEYS Dec. 22, 1959 G. P. BENTLEY ET AL 2,918,542
HERMETICALLY SEALED ROTARY SWITCHES
Filed June 11, 1957 5 Sheets-Sheet 3
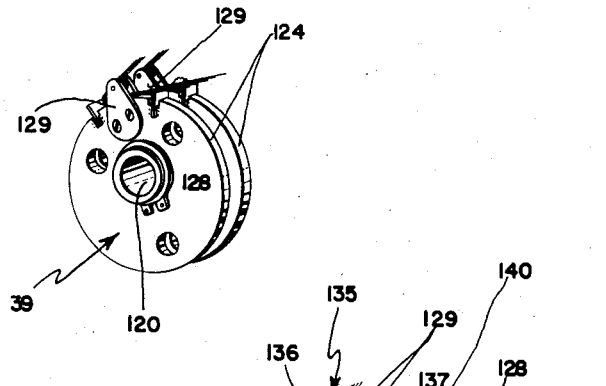
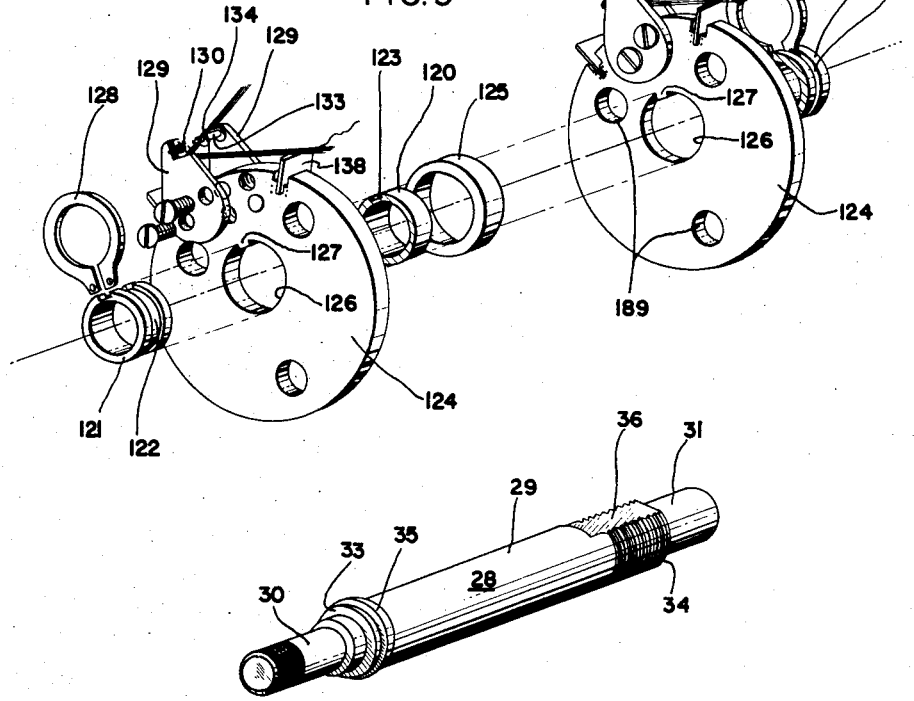
INVENTORS
GEORGE P. BENTLEY
GEORGE C. McNABB
EDWARD L. LEWIS
BY Thomas S. Ross
Joseph R. Spalla
ATTORNEYS Dec. 22, 1959
G. P. BENTLEY ET AL
2,918,542
HERMETICALLY SEALED ROTARY SWITCHES
Filed June 11, 1957
5 Sheets-Sheet 4
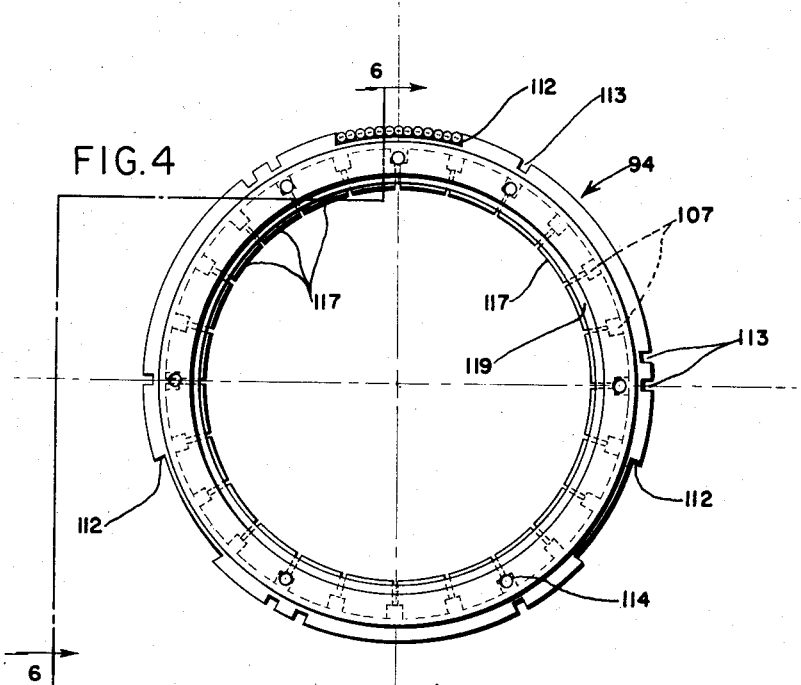
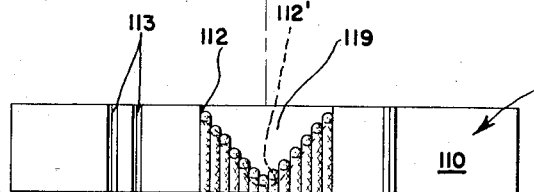
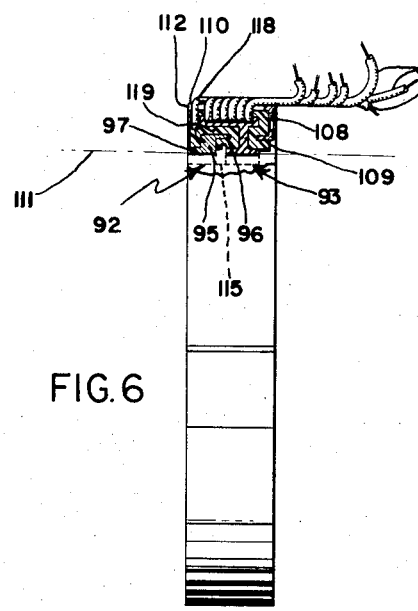
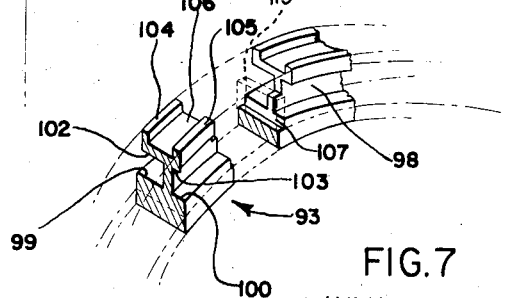
INVENTORS
GEORGE P. BENTLEY
GEORGE C. McNABB
EDWARD L. LEWIS
BY Thomas S. Ross
Joseph R. Spalla
ATTORNEYS Dec. 22, 1959  G. P. BENTLEY ET AL  2,918,542
HERMETICALLY SEALED ROTARY SWITCHES
Filed June 11, 1957  5 Sheets-Sheet 5

INVENTORS
GEORGE P. BENTLEY
GEORGE C. McNABB
EDWARD L. LEWIS
BY Thomas S. Ross
Joseph R. Spalla
ATTORNEYS United States Patent Office 2,918,542
Patented Dec. 22, 1959

2,918,542

HERMETICALLY SEALED ROTARY SWITCHES

George P. Bentley, Franklin, George C. McNabb, Attleboro, and Edward L. Lewis, Sharon, Mass., assignors to Instrument Development Laboratories, Inc., Attleboro, Mass., a corporation of New York Application June 11, 1957, Serial No. 665,021

14 Claims. (Cl. 200—28)

This invention relates to rotary switches, more particularly it relates to high speed rotary switches having internal cylindrical slip ring-commutator surfaces and statically balanced fully pivoted brush assemblies mounted for rotation about the axis of generation of said surfaces; and specifically it relates to compact and rugged slip ring-commutator constructions and brush assemblies particularly suited for use in high speed rotary switches.

Rotary switches of the above mentioned type are adapted for use in high speed multi-circuit commutating applications, such as sampling, programming, and telemetering. In all these applications, size, compactness and long maintenance free life are important considerations. Additionally, accuracy and reliability over wide temperature and pressure ranges and the ability to withstand shock and vibration are also desirable objectives particularly in switches employed in telemetry.

The instant invention is a rotary switch which employs a cylindrical construction throughout to provide physical strength and rigidity thereby to enable the construction of a small compact unit. Basically the invention comprises a cylindrical shell which contains a plurality of axially stacked annulated slip ring commutator wafers having internal cylindrical generating surfaces over which the brushes of a plurality of brush assemblies mounted on an axially driven shaft are adapted to ride. This cylindrical construction enables control of surface contact accuracy at the brush commutator surface. Additionally, the construction of the slip-ring commutator wafers is such that the contact areas presented to the brushes is always constant and the brush assemblies are so constructed that brush pressure variations are negligible over prolonged periods of use. Further the cylindrical shell and a shaft driving motor are all encased in a cylindrical casing which enables the unit to be hermetically sealed.

An object of the invention therefore is to provide a high speed rotary switch suitable for use in multi-circuit commutating applications.

Another object of the invention is to provide a small compact hermetically sealed high speed rotary switch operable over a wide range of ambient conditions.

Another object of the invention is the provision of a wafer like slip ring-commutator construction having in line cylindrical commutating surfaces whereby phase errors due to brush width variations are eliminated.

Another object of the invention is the provision of a method of constructing integrated slip ring-commutator assemblies whereby division of commutator segments may be accomplished with dividing head accuracy.

Another object of the invention is the provision of a slip ring-commutator assembly which is so constructed that long electrical leakage paths are provided between commutator segments.

Another object of the invention is the provision of a compact and rugged high speed rotary switch capable of withstanding high acceleration and vibrations over large frequency ranges while maintaining its accuracy.

Still another object of the invention is to provide a statically balanced fully pivoted brush suspension whereby brush pressure variations are small as the brushes wear.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 3 is a perspective view of the brush assembly drive shaft of Fig. 1;

Fig. 4 is a plan view of an assembled wafer constructed in accordance with the invention;

Fig. 5 is a top view of an assembled wafer;

Fig. 6 is a cross sectional view of a wafer taken along lines 6—6 of Fig. 4;

Fig. 7 is a fragmentary perspective view of a commutator ring before separation of the segments;

Fig. 8 is a perspective view of a brush assembly in accordance with the invention;

Fig. 9 is an exploded perspective view of the brush assembly;

Figure 1:
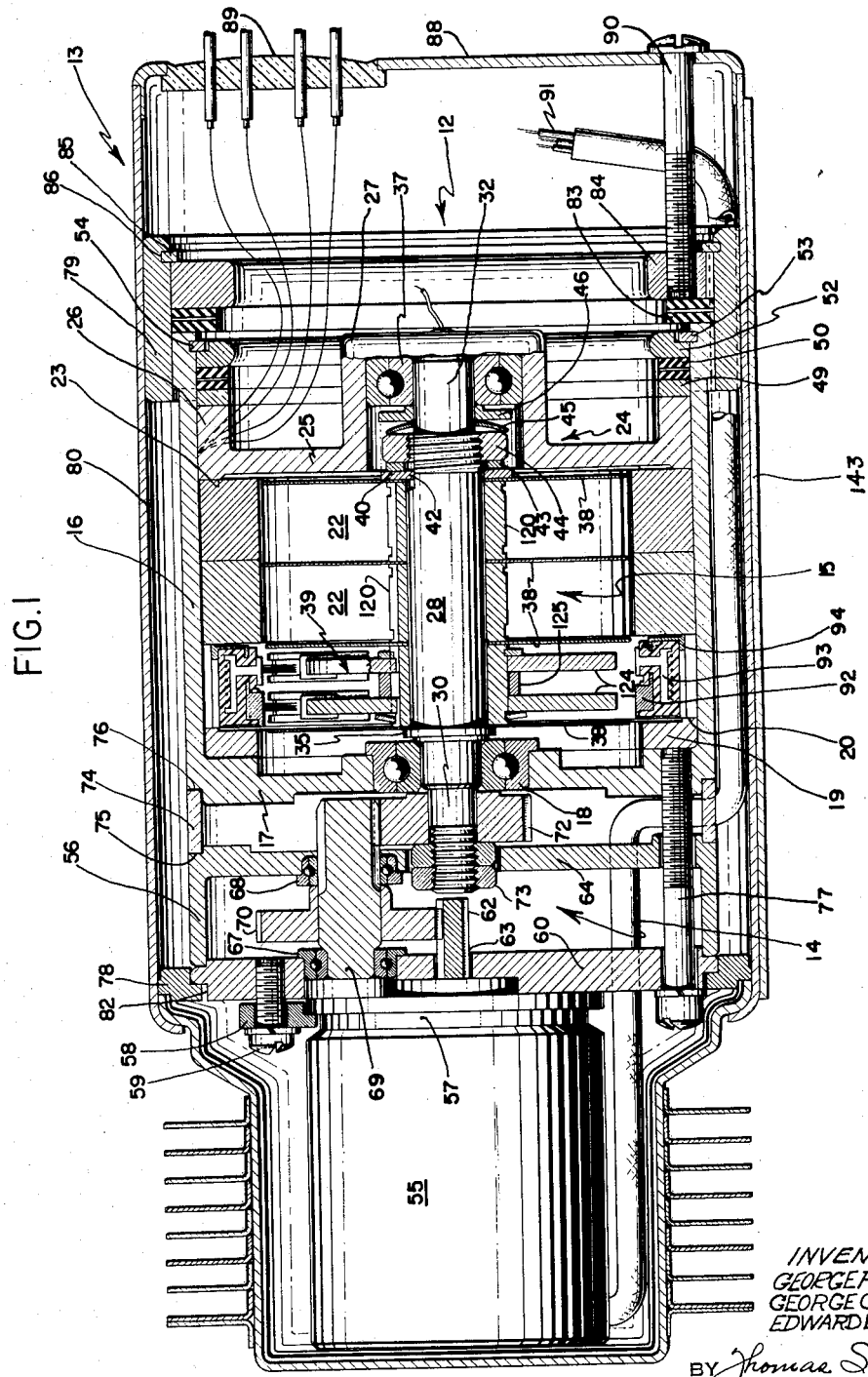
Fig. 1 is a view with parts in section of a hermetically sealed rotary switch unit constructed in accordance with the invention.

Referring now to the drawings wherein like reference characters designate like or corresponding parts throughout the several views, and particularly to Fig. 1 which illustrates a specific embodiment, there is shown a cylindrical rotary switch unit, generally designated by reference numeral 12 enclosed within a hermetic case generally designated by reference numeral 13. The rotary switch unit comprises a drive section 14 and a switching section 15. The switching section comprises a cylindrical shell 16 preferably aluminum or brass which is open at its forward end and substantially closed at its rear end by a wall 17. The wall 17 is provided with a central opening which is adapted to fixedly retain the outer race of a ball bearing 18. Stacked against the interior surface of the wall 17 is a spacer ring 19 formed with a forwardly extending annular peripheral shoulder 20. A plurality of cylindrical annulated slip and commutator wafer rings generally designated by numeral 22, and which will be more particularly described with reference to Figs. 4–7, are axially stacked within the cylindrical shell in abutting relation to the shoulder 20. The outer diameters of the wafers 22 are substantially equivalent to the inner diameter of the cylindrical shell 16 and are adapted to be securely held within the cylindrical shell between the shoulder 20 and a rearwardly extending peripheral shoulder 23 on a rearwardly biased annular shell closure piece 24; both shoulders abutting the outer retaining rings of the wafers. The closure piece comprises a circular centrally bored plate 25, equivalent in diameter to the inner diameter of the shell, which is formed with a forwardly axially extending outer peripheral annulus 26 and with a forwardly axially extending inner peripheral annulus 27.

Axially of the cylindrical shell is a shaft 28 rotatably mounted in the bearing 18 in the rear wall of the housing. The shaft, as most clearly shown in Fig. 3, has a central portion 29 of relatively greater diameter than the rear 30 and forward 32 portions thereof thereby forming shoulders 33 and 34 respectively. The central portion has an annular flange 35 adjacent the shoulder 33 and a flat 36 extending rearwardly from the shoulder 34. The rear portion 30 which extends through the rear wall 17 is coupled as will be apparent infra to the drive section 14 and the forward portion 32 extends into a bearing 37 mounted within the cylinder formed by the annulus 27 in the closure piece 24. The central portion is threaded over the flat 36 extending rearwardly of the shoulder 34 for reasons which will be apparent.

Figure 11:
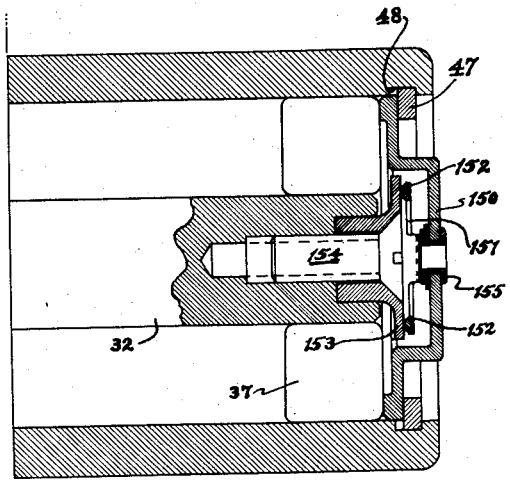
Figs. 11, 12 and 13 are views showing the manner in which the rotating shaft is grounded.
Figure 12:
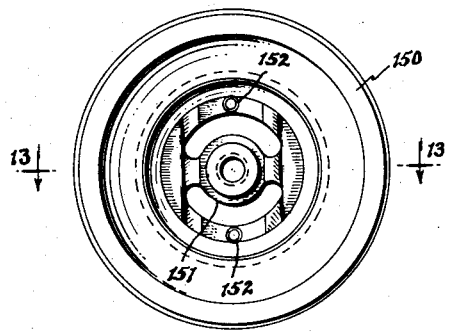
Figure 13:
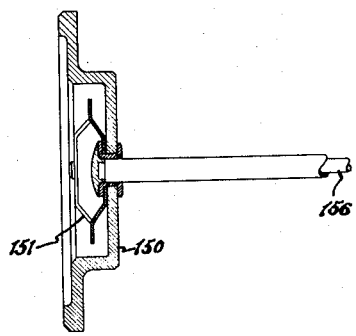

A plurality of annular electromagnetic and electrostatic shields 38 to eliminate self generated noise and a plurality of circular brush assemblies 39 equivalent in number to the number of wafers 22, as will be more particularly described with reference to Figs. 8 and 9, are mounted on the enlarged portion of the shaft in alternate fashion and are held against rotation on the shaft by compressive force applied through a washer 40 which has a detent 42 adapted to fit over the flat 36 on the shaft, by a second lock washer 43, and by a nut 44. As is apparent, as the nut 44 is threaded on the shaft 28, the brush assemblies 39 will be held in compression between the annular flange 35 and the washer 40. An annular spring plate 45 is interposed between the nut 44 and a spacing washer 46 which abuts the inner race of the ball bearings 37. The spring plate 45 is adapted to resiliently bias the shaft 28 against axial movement. As is apparent from Fig. 11 the bearing 37 is held between the spacer washer 46 and the flanged portion of a domed end plate 150 which is maintained in abutment with the bearing by a lock ring 47 mounted in an annular groove 48 in the wall of the cylinder formed by the inner annulus 27. The domed end plate 150 as viewed in Fig. 11 mounts a resilient spider plate 151 having stationary contracts 152 adapted to ride against a circular plate 153 affixed to the end 32 of the shaft as by a screw 154 threaded into the end of the shaft. The spider plate 151 is held fixed to the domed end plate by a rivet 155 or the like to which a ground wire 156 may be soldered. The closure piece 24 is maintained fixedly within the shell 16 and in abutting relation with the forwardmost ring 22 by a rigid, a resilient and another rigid annular spacer 49, 50 and 52 respectively which press against the forward end of the annulus 26 of the closure piece and which are held in such relation by a lock ring 53 secured in an annular groove 54 internally formed adjacent the end of the cylindrical shell 16. As is apparent the resilient spacer 50 biases the closure piece 24 toward the wafer thereby preventing axial movement of the closure piece and wafers. Rotation of the wafers and closure piece relative to the shell 16 and to one another is prevented by the compressive force applied by the resilient spacer 50 and by the close tolerances between the outer diameter of the closure piece and wafers and the inner diameter of the shell 16. In accordance with the invention the spring plate 45 and the resilient spacer 50 are designed to provide sufficient initial axial load to prevent displacement of the parts held under compression under any design shock loads to which the instrument may be subjected.

The brush assembly mounting shaft 28 may be driven directly by any suitable rotary power source or indirectly through gearing by a synchronous motor. In the specific embodiment shown in Fig. 1 the drive section 14 for rotating the shaft 28 comprises in combination a synchronous motor 55 and a gear box 56. The forward end of the synchronous motor is provided with an annular groove 57 whereby in cooperation with at least three locking dogs 58 it is secured to the rear wall 59 of the cylindrical gear box. As is apparent the dogs 58 (only one of which is shown) grip the groove as the screws 59 on which they are mounted are threaded into the rear wall 60 of the gear box. As is apparent the splined output shaft 62 of the motor 55 extends through a central recessed opening 63 in the rear wall of the gear box. The rear wall 60 and the forward wall 64 of the gear box are also provided with opposite axially offset circular openings which are adapted to fixedly hold the outer races of ball bearings 67 and 68 respectively which rotatably support an intermediate shaft 69. As shown in Figure 1, shaft 69, which carries a gear 70 adapted to mesh with the splined motor shaft, extends through and beyond the bearing 68 in the forward wall 64 of the gear box. The end of shaft 69 extending beyond the forward wall of the gear box is splined whereby it is adapted to mesh with the teeth of a shaft drive gear 72 keyed or threadedly mounted on and adjacent the end of the rear portion 30 of the drive shaft 28 and suitably locked thereon as by a pair of lock nuts 73; a central hole in the front wall of the gear box being provided for clearance. The gear box and the shell, as seen in the figure, are properly spaced, to provide room for the drive gear 72, by an annular ring 74, which fits into annulae 75 and 76 formed on adjacent peripheral edges of the shell and forward gear box wall. The annular ring 74 is preferably of stainless steel to serve as a thermal barrier between the gear case 56 and shell 16 so that motor heat is prevented from passing directly to the switching assembly, preferring to pass through spacer 78, which is a good heat conductor, to copper radiating fins on the rear of the case. The gear box, ring, and shell are securely held together by at least three screws 77 extending through the gear box and into the rear wall 17 of the shell. The drive gear 72, as shown, abuts the rear surface of the inner race of ball bearing 18 thereby aiding, in cooperation with the shoulder 33 on the shaft which abuts the forward surface of the inner race, to prevent axial movement of the shaft.

Figure 2:
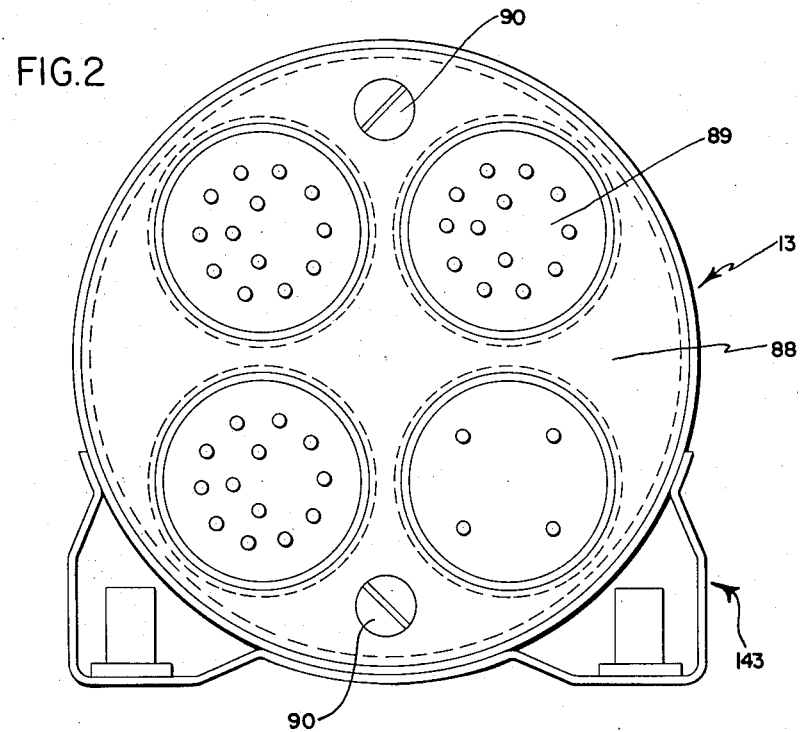
Fig. 2 is an end view of a hermetically sealed switch unit.

The switch unit 12 assembled as described permits the rotating shaft assembly to be electrically grounded for noise reduction and is housed in the hermetically sealed cylindrical casing 13 as seen in Figs. 1 and 2 whereby the ambient relative humidity and atmospheric composition may be controlled. The casing is preferably steel and internally copper plated to provide electromagnetic and electrostatic shielding for noise reduction. The switch unit 12 is radially spaced from the cylindrical casing 13 by annular spacers 78 and 79 suitably secured to the inner surface 80 of the casing adjacent the rear wall 60 of the gear box and the open end of the cylindrical shell 16. As is apparent the spacer 78 fits into an annular ridge 82 in the rear wall of the gear box thereby preventing rearward axial movement of the switch unit 12 with respect to the casing 13. Forward axial movement of the switch unit is prevented by a resilient and rigid annular spacer 83 and 84 respectively which are held in abutting relation with the open end of the cylindrical shell 16 by a lock washer 85 in an annular groove 86 of the forward radial spacer 79. The radial spacer 79 is also provided with a circular opening whereby the motor leads 91 which extend between the switch unit and the casing may be brought out of the forward end of the unit. The end closure piece 88 is hermetically sealed to the casing as by brazing and is provided with hermetic seals 89 whereby input and output leads to the motor and wafers may be brought out from the casing and is secured by bolts 90 which extend to and are threaded into the axial spacer 84. Further casing 13 adjacent the motor is provided with cooling fins adapted to provide a large surface area to rapidly dissipate the heat generated by the motor.

Referring now to Figs. 4–7 there is shown the annulated construction of an integral slip and commutator wafer ring assembly. The construction comprises a slip ring 92 (Fig. 6) a commutator ring 93, and an outer retaining ring 94. The slip ring comprises an annular body portion 95 having annular flanges 96 and 97 extending axially from diametrically opposite sides of the body portion flush with the top and bottom surfaces of the body portion. Flange 96 is relatively thinner than flange 97 and is radially slotted about its periphery.

The commutator ring 93 preferably formed of rhodium comprises an annular body portion 98 having first and second annular flanges 99 and 100 extending axially from opposite sides of the body portion flush with the bottom surface thereof, and third and fourth annular flanges 102 and 103 extending axially from opposite sides of the body portion flush with the top surface thereof. As seen in Figure 7 the third flange 102 is longer than the fourth flange 103. Both the third and fourth flanges are further provided at their ends with radially extending annular flanges 104 and 105 thereby forming an annular channel 106 in the outer surface of the commutator ring. The commutator ring is thereafter provided with equally spaced stepped radial slots 107 (Figs. 4 and 7) about its periphery from the channelled top surface down into the first and second flanges, the number of slots depending on the number of segments desired in some particular application of the unit. It is to be noted that the radial distances to the inner peripheries of both the slip ring and commutator ring are equivalent.

The outer retaining ring 94 comprises an annular body portion 108 which has an axially extending flange 109 extending from one side flush with the bottom thereof, and a relatively long axially extending flange 110 extending from the same side as flange 109 and flush with the top surface thereof. As seen in the figure, which illustrates a specific embodiment, the upper flange 110 is provided with three equally peripherally spaced axially extending grooves 112, one of which has a substantially cutout portion 112′, and with a plurality of similar relatively narrow indexing or alignment reference grooves 113. Additionally the body portion 108 is provided with a plurality of holes 114 about its circular face which in combination with a potting compound provides strength and rigidity to the assembled wafer.

In assembly the slip ring 92 is placed adjacent the commutator ring 93 with the flange 96 thereof overlapping the first flange 99 of the commutator ring and maintained spaced therefrom by a separator ring 115 (shown dotted in Fig. 6) formed of an electrochemically active metal such as aluminum. Electrochemically active keys 115′ are also placed within the narrow portion of each of the stepped radial slots for reasons which will hereinafter appear. Insulated lead wires 116 are secured as by soldering to predetermined ones of the segments 117 formed by said slots in the commutator ring and a lead wire 118 to the slip ring. The lead wires 116 and 118 are then caused to lie flat in the annular channel 106 in the outer surface of the commutator ring. The outer retainer ring 94 is then placed with its long flange 110 over both the slip ring and commutator ring and with its flange 109 between the second and fourth flanges 100 and 103 of the commutator ring; the lead wires being brought out through the cutaway groove 112 (Fig. 5). The rings disposed with respect to each other as described above are held in a suitable jig and a potting compound 119 of insulating material such as an epoxy resin whose coefficient of thermal expansion matches that of the metal parts is poured into and fills all the slots in and spaces around and between the intermeshing flanges of the rings and the wide portion of the stepped slots 107 between segments whereby the assembly becomes an integrated annular wafer of great strength and rigidity.

Thereafter the wafer is placed on a lathe and the inner surfaces of the slip ring and commutator ring (shown dotted in Fig. 6) are turned down until the bottom of the radial slots 107, which extend down into the lower flanged body portion of the commutator ring are reached (line 111) thereby dividing the commutator ring into individual segments insulated from one another. Thereafter the remainder of aluminum insert 115 separating the slip ring and commutator ring and the keys 115′ within the narrow portion of the stepped radial slots 107 are chemically etched away to provide undercut segments. As is apparent, the contact surfaces of the segments are cylindrical sections thereby permitting accurate timing. The above method permits division of the commutator segments 117 from one another with dividing head accuracy as they are an integral part of the retaining ring 94 during embedment. The above method which is termed "double slotting" provides a commutator having long electrical leakage paths between segments with concomitant high intersegment resistances. The leads 116 are brought out as heretofore stated through one grooved section of the retaining ring flange as shown in Figure 5 and are caused when assembled to lie within the groove 112 thereof as seen in the assembled view of Figs. 4 and 5.

Referring now to Figures 8 and 9 there is shown one of the brush assemblies 39 shown in Figure 1. Each assembly comprises a hollow shaft 120 having a radially extending flange 121 and a shallow annular groove 122 on each end and an axial groove 123 cut into the surface.

Mounted on the shaft are two circular disks 124 spaced apart by a cylindrical sleeve 125. Each disk has an eccentrically disposed bore 126 formed therein which is provided with a detent 127 which cooperates with the groove 123 in the shaft thereby to prevent rotation of the discs relative to the shaft. Thereafter the discs are locked on the shaft between the sleeve and suitable lock springs 128 interposed between the flanges and discs. As seen in the figure each disc carries two brush suspension supports 129 containing suitable jewel bearings 130 adapted to rotatably mount a shaft 133 in electrically insulated relation from the discs. Securely mounted on the shaft 133 is a bracket 134 adapted to support a brush generally designated by numeral 135.

Each brush comprises a plurality of wires, preferably of a precious metal alloy such as an alloy consisting of 21% silver, 27% gold, 4% copper, 32% palladium and 16% platinum. The wires are welded together at one end and bent into an acute angle thereby forming a spring contact leg 136 and an anchor leg 137. The contact leg 136 of the angle formed by the bent wires is welded at a point between its ends to the bracket 134 supported on shaft 133 as shown and the other leg 137 of the angle formed by the bend is adapted to rest on a blank 138 of insulating material secured in a radial slot in the discs. As is apparent when the brush assemblies are placed in operative position within the switch unit 12 the contact leg ends of the brushes engage the slip and commutator ring surfaces and, due to the pivoted brackets 134 to which the brushes are welded, are bent toward the anchor leg ends 137 of the brushes 135 which are constrained by the blanks 138 of insulating material. Because of the eccentric mounting each disc has holes 189 cut out to provide a statically balanced unit; the eccentric mounting of the shaft with respect to the geometric axes of the discs counteracting the added weight of the brush suspensions. After completion of the brush assemblies 39 the anchor ends 137 of the brushes are electrically connected by a wire 140 to provide a current path between slip ring and commutator.

The above construction provides a statically balanced fully pivoted brush suspension which permits accurate angular and linear positioning of the point of contact with the slip and commutator rings due to the high stiffness between pivot and point of contact, while simultaneously giving a very low spring rate whereby brush pressure variations are small as the brushes wear. The use of jeweled pivots in the brush suspension permits precise brush location and high electrical insulation. The use of the metallic brush design permits constraint of the brush so that it can pass from one commutator segment to another across the air gaps between segments.

Referring again to Fig. 1 there is shown a three pole rotary switch employing three wafer like slip ring and commutator ring assemblies. As hereinbefore stated the retaining rings of the wafers have, in this embodiment, three grooves spaced at 120° intervals. The wafers are stacked inside the barrel with all the grooves in alignment and with the grooves containing the leads 116 and 118 to each ring 120° apart.

The leads then from the rearwardmost wafers 22 extend through the aligned grooves 112 of the intermediate and forwardmost wafers 22; the leads from the intermediate wafer through the aligned groove in the forwardmost wafer; and the leads from the forwardmost wafer extend toward the end closure piece. This method of bringing leads out permits multiple stacking of rings with minimum physical space requirements. The end closure piece is also suitably provided with three 120° spaced holes whereby all the leads may be brought out through the hermetic headers 89 (Fig. 1), in the hermetically sealed casing without destroying the ambient conditions therein. As shown in Figs. 1 and 2 suitably mounted brackets generally designated by reference 143 may be secured by any suitable means to the casing 13.

Figure 10:
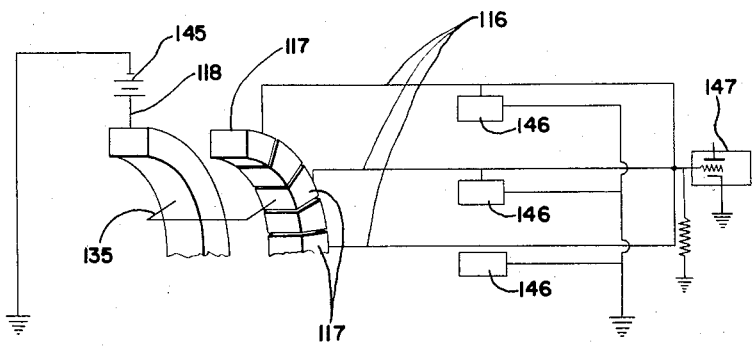
Fig. 10 is a schematic view of one application of the rotary switch in a telemetering application.

Referring to Fig. 10 there is shown a fragmentary schematic view of the operation of the switch in a telemetering application. Power will be supplied to the synchronous motor through the motor leads 91 (not shown) and to the slip ring leads 118 from a suitable power source 145. The leads 116 connected to alternate segments of the commutator ring may, for example, be connected to resistance strain gauges 146 connected in circuit with a transmitter 147 whereby the voltage drops across the strain gauges 146 may be utilized to modulate the transmitter 147 as is understood in the art. In operation then, as the brushes 135 are rotated alternately successive segments 117 of the commutator are in turn energized. The current path from the power source being through the slip ring and associated contacting brush, across to the commutator brush, through the segment contacted through the connected strain gauge and to ground; the transmitter input being connected across the strain gauges. While the above example shows the commutator used to switch power sequentially to circuit elements it is to be understood that it may be used for sequentially sampling and connecting the outputs of multiple circuits to a single utilization circuit.

It should be understood, therefore, that the foregoing disclosure relates only to a single embodiment of the invention and that it is intended to cover all changes and modifications of the example of the invention herein chosen for the purposes of the disclosure, which do not constitute departures from the spirit and scope of the invention.

The invention claimed is:

1. A high speed rotary switch comprising a cylindrical housing, a shaft axially mounted in said housing, a plurality of annulated slip-ring commutator assemblies mounted about the inner periphery of said housing having radially inward facing contact surfaces, a plurality of statically balanced brush assemblies mounted on said shaft, brushes pivotally mounted in insulated relationship on said assemblies adapted to ride said contact surfaces, and means for rotating said shaft.

2. A high speed rotary switch comprising a substantially closed cylindrical housing, a shaft axially mounted between the end closure plates of said housing, a plurality of cylindrical slip ring commutator wafers stacked axially within said housing, a plurality of statically balanced brush mounting assemblies mounted on said shaft, a pair of electrically connected resilient metallic brushes pivotally mounted in insulated relationship on each of said assemblies adapted to slide over the internal surfaces of each of said wafers, and means for rotating said shaft.

3. A rotary switch as recited in claim 2 whereby each of said wafers comprise a slip ring, a commutator ring having a plurality of in line cylindrical segments, and an outer retaining ring, said rings having intermeshing cross sections, and insulating means bonding said rings and segments together.

4. A rotary switch as recited in claim 2 whereby said statically balanced brush assemblies comprise a cylindrical hub, spaced circular disks eccentrically mounted on said hub, and brush support means mounted on said disks at peripheral points closest to the axis of said shaft, said resilient metallic brushes being pivotally and insulatingly mounted on said brush support means.

5. A rotary switch comprising a cylindrical housing, means for rotatably mounting a shaft with its axis coincident with the axis of said housing, a plurality of slip and commutator ring wafers concentrically mounted within and axially of said housing, electrical wiring connected to each of said slip rings and to predetermined ones of the segments of associated commutator rings comprising a wafer, an outer retaining ring associated with each wafer, said wiring to each wafer being axially disposed between said housing and said retaining rings, a plurality of circular disks eccentrically mounted on said shaft, brush suspension supports insulatedly mounted on said circular disks, a shaft mounted between said supports, and means comprising resilient brush means mounted on said shaft.

6. A rotary switch comprising a cylindrical housing, a plurality of cylindrical annulated wafers having outer peripheral diameters equivalent to the inner peripheral diameter of said housing stacked axially in said housing, said annulated wafers each comprising a slip ring, an adjacent commutator ring of equivalent inner peripheral diameter and an outer retaining ring, said rings having intermeshing cross sections, a plurality of lead wires connected to said slip rings and to said commutator rings, said wires associated with each wafer being interposed about the outer periphery of said commutator ring between said commutator ring and said outer retaining ring, spaced axial grooves in the outer peripheral surface of said retaining rings, openings in one of said grooves of each of said wafers for bringing out associated lead wires, means insulatingly bonding the leads, the slip and retaining rings and the segments of a commutator ring comprising a wafer together, said grooves of adjacent wafers being aligned whereby said lead wires may be brought out of the housing, said lead wires being adapted for connection to external circuitry, and means comprising electrically connected brush means mounted for rotation about the axis of said housing for engaging said slip rings and sequentially engaging the segments of associated ones of said commutator rings.

7. A high speed rotary switch comprising a substantially closed cylindrical housing, a shaft axially mounted between the end closure plates of said housing, means for electrically grounding said shaft, a plurality of cylindrical slip ring commutator wafers stacked axially within said housing, a plurality of statically balanced brush mounting assemblies mounted on said shaft, electrically connected pairs of resilient metallic brushes pivotally mounted in insulated relationship on said assemblies adapted to slide over the internal surfaces of said wafers whereby current paths are completed between said slip rings and successive segments of associated commutator rings, and means for rotating said shaft.

8. A high speed rotary switch as recited in claim 7 wherein said wafers are formed of rhodium and wherein said metallic brushes are formed of precious metal alloy whereby internally generated noise is reduced to a minimum.

9. A high speed rotary switching device comprising a cylindrical housing, a plurality of unitary slip-commutator rings shock mounted about the inner periphery of said housing, conductors connected to said slip-commutator rings adapted to be connected to external circuitry, brush means comprising a pair of electrically connected brushes adapted to ride over the internal surfaces of each of said slip-commutator rings, and means for rotating said brush means whereby discrete current paths are completed between said slip rings and successively contacted segments of associated commutator rings.

10. A unitary slip ring commutator construction comprising a slip ring, a commutator ring and an outer retaining ring, said rings having intermeshing cross sections, said commutator ring comprising a plurality of in line cylindrical segments partially bonded to each other and to said slip and retaining rings by an insulating material.

11. A unitary slip ring commutator construction comprising a slip ring, a plurality of in line cylindrical segments forming a commutator ring having the same internal diameter as said slip ring, an outer retaining ring, said rings having intermeshing cross sections, an insulating bonding material between said segments and between said intermeshing segments, slip ring and retaining ring for securely holding said slip commutator, and retaining rings together in insulated relationship, conductors secured to said slip and commutator rings, said conductors lying between said slip and commutator rings and said outer retaining ring.

12. A high speed rotary switching device comprising a cylindrical housing, a shaft axially mounted in said housing, a plurality of annulated slip-ring commutator assemblies axially mounted about the inner periphery of said housing having radially inward facing contact surfaces, statically balanced brush assemblies mounted on said shaft, brushes pivotally mounted in insulated relationship on said assemblies adapted to ride said contact surfaces, and means for rotating said shaft.

13. A high speed switching device for changing a plurality of circuit connections comprising a cylindrical housing, a plurality of unitary slip-commutator rings axially stacked about the inner periphery of said housing having radially inward facing contact surfaces, means comprising first circuit means connected to each of said slip rings, means comprising second circuit means connected to the commutator segments of each of said rings, statically balanced brush support means rotatably mounted in said housing; electrically connected brushes associated with each slip commutator ring adapted to ride the contact surfaces of said rings, means for pivotally mounting said brushes on and insulated from said support means and means for rotating said brush support means.

14. A high speed rotary switch comprising a cylindrical housing, a plurality of annulated slip-ring commutator wafers axially stacked within said housing having radially inward disposed contact surfaces, each of said wafers comprising a slip ring, a segmented commutator ring and an outer retaining ring, said rings having intermeshing cross sections, means insulatingly bonding said slip ring, said commutator segments and said retaining ring comprising each wafer, a plurality of resilient metallic brushes pivotally mounted axially of said housing and insulated therefrom adapted to ride the contact surfaces of said wafers, and means for rotating said pivotally mounted brushes.

References Cited in the file of this patent

UNITED STATES PATENTS

| | | |
|---|---|---|
| 1,420,026 | Eckre | June 20, 1922 |
| 1,545,422 | Graichen | July 7, 1925 |
| 2,193,254 | McClure | Mar. 12, 1940 |
| 2,273,840 | Dever | Feb. 24, 1942 |
| 2,455,864 | Hanna | Dec. 7, 1948 |
| 2,483,115 | Wall | Sept. 27, 1949 |
| 2,634,342 | Baechler et al. | Apr. 7, 1953 |
| 2,661,403 | Wilson | Dec. 1, 1953 |
| 2,696,658 | Polard | Dec. 14, 1954 |
| 2,707,731 | Backus | May 3, 1955 |
| 2,774,831 | Lafferty et al. | Dec. 18, 1956 |